United States Patent
Dawe et al.

(10) Patent No.: US 11,092,214 B2
(45) Date of Patent: Aug. 17, 2021

(54) HIGH RATIO TRACTION DRIVE TRANSMISSION

(71) Applicant: Dana Automotive Systems Group, LLC, Maumee, OH (US)

(72) Inventors: Daniel J. Dawe, Austin, TX (US); Joseph J. Horak, Austin, TX (US); Jeremy M. Kaiser, Leander, TX (US); Charles B. Lohr, III, Jonestown, TX (US); Ryan D. Nelms, Austin, TX (US); Sebastian J. Peters, Cedar Park, TX (US); Benjamin L. Powell, Austin, TX (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 47 days.

(21) Appl. No.: 16/656,629

(22) Filed: Oct. 18, 2019

(65) Prior Publication Data
US 2020/0124137 A1  Apr. 23, 2020

Related U.S. Application Data

(60) Provisional application No. 62/747,744, filed on Oct. 19, 2018.

(51) Int. Cl.
*F16H 1/28* (2006.01)
*B60K 6/365* (2007.10)
*F16H 15/52* (2006.01)

(52) U.S. Cl.
CPC .......... *F16H 1/2809* (2013.01); *B60K 6/365* (2013.01); *F16H 15/52* (2013.01)

(58) Field of Classification Search
CPC ........ F16H 1/2809; F16H 15/52; F16H 13/06; B60K 6/365
See application file for complete search history.

(56) References Cited

U.S. PATENT DOCUMENTS

| | | | | |
|---|---|---|---|---|
| 4,224,840 A | * | 9/1980 | Kraus | F16H 13/04 476/61 |
| 4,408,503 A | * | 10/1983 | Kraus | F16H 13/04 476/65 |
| 7,153,230 B2 | * | 12/2006 | Ai | F16H 13/06 475/166 |
| 2009/0124447 A1 | * | 5/2009 | Marumoto | G03G 15/757 475/195 |

* cited by examiner

*Primary Examiner* — Justin Holmes
(74) *Attorney, Agent, or Firm* — Marshall & Melhorne, LLC

(57) ABSTRACT

A high ratio traction drive transmission includes a sun roller, a traction ring, a plurality of traction planets in contact with the sun roller and the traction ring, at least one reaction roller in contact with at least one of the traction planets, and a carrier assembly coupled to at least one of the traction planets and the at least one reaction roller. The sun roller has a first longitudinal axis and the traction ring is aligned coaxially with a second longitudinal axis, wherein the first longitudinal axis is radially offset from the second longitudinal axis.

15 Claims, 10 Drawing Sheets

SECTION Y-Y

SECTION Z-Z

DETAIL A

DETAIL B

DETAIL C

HIGH RATIO TRACTION DRIVE TRANSMISSION

CROSS-REFERENCE TO RELATED APPLICATION

The present application claims the benefit of U.S. Provisional Patent Application Ser. No. 62/747,744, filed on Oct. 19, 2018, which is fully incorporated in its entirety by reference herein.

FIELD

The present disclosure relates to a vehicle, and more particularly to a high ratio traction drive transmission for a vehicle

BACKGROUND

Electric and hybrid electric vehicles are enjoying increased popularity and acceptance due in large part to the cost of fuel and greenhouse carbon emission government regulations for internal combustion engine vehicles. While electric vehicles solely use an electric motor, hybrid electric vehicles normally include both an internal combustion engine as well as an electric motor to propel the vehicle.

In current electric axle designs for both consuming as well as storing electrical energy, the rotary shaft from a combination electric motor is coupled by a gear-train, and/or planetary to the driven wheels of the vehicle. As such, the rotary shaft for the electric motor rotates in unison with the wheel based on the speed ratio of the gear-train. Powertrains implementing electric motors are faced with a large speed reduction between the electric motor and the driven wheels. In some instances, electric motors having high rotational speeds, for example higher than 30,000 rpm, are being considered for implementation in a variety of powertrain configurations. It is appreciated that traditional gear-train structures with high over-all transmission ratios, for example those with over-all transmission ratios in the range of 25:1 to 40:1, are needed for implementation of high-speed electric motors. The first stage of said gear-trains will be subject to abnormally high speeds, and it is advantageous to reduce that high speed as much as possible for example from 5:1 to 11:1 for the second and/or final stages of said gear-trains.

Traditional toothed gearing having high transmission ratios operating at high input speeds can be prohibitively noisy during operation and/or are prohibitively expensive to manufacture. As electric motors develop into higher shaft speeds to reduce the size and cost of power electronics, traditional geared solutions encounter noise and durability challenges. Accordingly, it would be desirable to develop a gear-train that mitigates these potential problems.

SUMMARY

In concordance and agreement with the present disclosure, a high ratio traction drive transmission for a vehicle that remains compact in size and weight, while minimizing noise and enhancing durability has surprisingly been discovered.

In one embodiment, a transmission, comprises: a sun roller having a first longitudinal axis; a traction ring having a second longitudinal axis, wherein the first longitudinal axis is radially offset from the second longitudinal axis; a plurality of traction planets disposed adjacent the sun roller and the traction ring; at least one reaction roller disposed adjacent at least one of the traction planets; and a carrier assembly coupled to at least one of the traction planets and the at least one reaction roller.

As aspects of certain embodiments, the plurality of traction planets includes at least one fixed traction planet and at least one floating traction planet.

As aspects of certain embodiments, the at least one fixed traction planet is in contact with at least one of the sun roller and the traction ring.

As aspects of certain embodiments, the at least one reaction roller is in contact with the at least one floating traction planet.

As aspects of certain embodiments, the carrier assembly is coupled to the at least one fixed traction planet.

As aspects of certain embodiments, the transmission further comprises a ring coupling coupled to the traction ring.

As aspects of certain embodiments, the ring coupling further comprises an inner hub having a spline interface arranged coaxially with the second longitudinal axis, an outer flange coupled to the traction ring, and a number of elastic fingers connecting the inner hub with the outer flange.

As aspects of certain embodiments, the transmission further comprises a cam shaft coupled to the reaction roller.

As aspects of certain embodiments, the transmission further comprises a cam positioner coupled to the cam shaft.

As aspects of certain embodiments, the cam shaft includes a cam lobe located between a first end and a second end thereof.

As aspects of certain embodiments, the cam shaft is coupled to the cam positioner at a first end thereof, and the cam shaft is coupled to the carrier assembly at a second end thereof.

As aspects of certain embodiments, the cam positioner is coupled to the carrier assembly.

As aspects of certain embodiments, the transmission further comprises a support shaft coupled to the at least one fixed traction planet, wherein the support shaft couples to a first carrier member of the carrier assembly.

As aspects of certain embodiments, the first carrier member includes a slot configured to receive the support shaft therein.

As aspects of certain embodiments, at least one of the first carrier member and the second carrier member includes at least one of a fluid groove and a raised dam, wherein the fluid groove and the raised dam are configured to direct fluid to at least one of the at least one reaction roller and at least one of the traction planets.

BRIEF DESCRIPTION OF THE DRAWINGS

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

DETAILED DESCRIPTION

Figure 1:
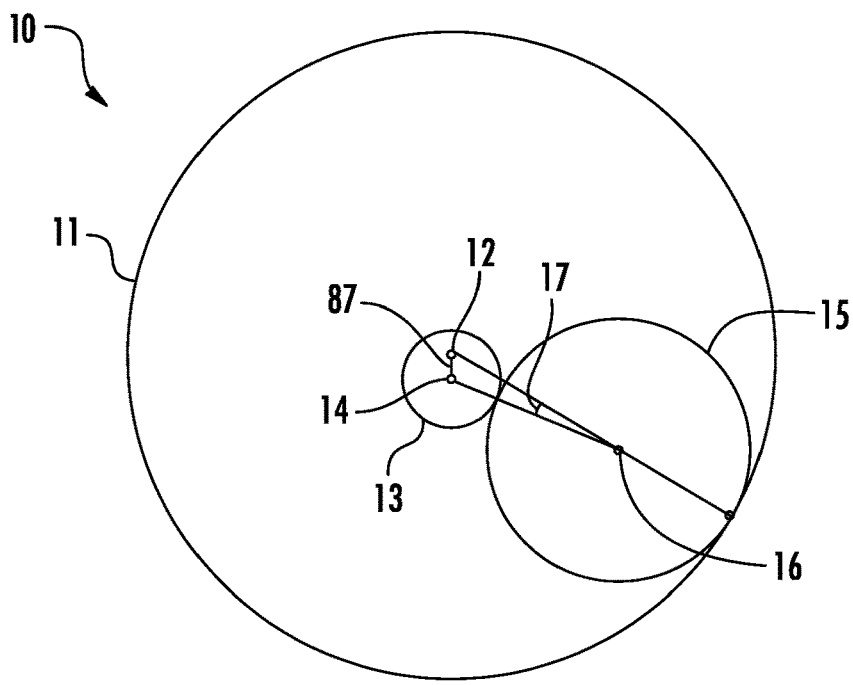
FIG. 1 is a schematic diagram of depicting certain components of a high ratio traction drive.

It is to be understood that the invention may assume various alternative orientations and step sequences, except where expressly specified to the contrary. It is also to be understood that the specific assemblies and systems illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise.

As used here, the terms "operationally connected," "operationally coupled", "operationally linked", "operably connected", "operably coupled", "operably linked," and like terms, refer to a relationship (mechanical, linkage, coupling, etc.) between elements whereby operation of one element results in a corresponding, following, or simultaneous operation or actuation of a second element. It is noted that in using said terms to describe inventive embodiments, specific structures or mechanisms that link or couple the elements are typically described. However, unless otherwise specifically stated, when one of said terms is used, the term indicates that the actual linkage or coupling is capable of taking a variety of forms, which in certain instances will be readily apparent to a person of ordinary skill in the relevant technology.

For description purposes, the term "radial" is used here to indicate a direction or position that is perpendicular relative to a longitudinal axis of a transmission. The term "axial" as used here refers to a direction or position along an axis that is parallel to a main or longitudinal axis of a transmission. For clarity and conciseness, at times similar components labeled similarly (for example, floating roller 109A and floating roller 109B) will be referred to collectively by a single label (for example, the floating roller 109).

It should be noted that reference herein to "traction" does not exclude applications where the dominant or exclusive mode of power transfer is through "friction." Without attempting to establish a categorical difference between traction and friction drives here, generally these will be understood as different regimes of power transfer. Traction drives usually involve the transfer of power between two contacting elements by shear forces in a thin fluid layer trapped between the contacting elements at a location sometimes referred to herein as "the contact" or "the traction contact". The fluids used in these applications allow traction coefficients greater than those of conventional mineral oils. The traction coefficient "µ", sometimes referred to herein as "operating µ", "applied µ", or "cam µ" (for circumstances where a cam is providing the contact loads) defines the ratio of tangential force (TF) to contact force (CF) expressed as µ=TF/CF at a traction contact. The maximum "available µ" (sometimes referred to herein as "fluid µ") is the traction coefficient that can sustain contact power transfer without gross slip and is determined by the traction fluid properties and the environmental operating conditions, such as Hertzian contact pressure between components, entrainment velocity of the fluid, fluid inlet temperature, contact "spin", among others existing in the contact at any particular time. Generally, as µ increases, contact creep also increases and if µ reaches and attempts to exceed the fluid µ, contact creep degrades into unacceptable gross slip and the contact experiences a reduction in power transfer capacity that is often accompanied by surface damage. Typically, friction drives generally relate to transferring power between two elements by frictional forces between the elements. For the purposes of this disclosure, it should be understood that the transmissions described here are capable of operating in both tractive and frictional applications based on the torque and speed conditions present during operation.

Referring to FIG. 1, a high ratio traction drive transmission 10 may include a spin-free traction planet 15 engaged to a traction ring 11 and a sun roller 13. In some embodiments, the traction ring 11 has a rotational center 12 that is offset by a distance represented by the offset construction line 87 from a rotational center 14 of the sun roller 13. The traction planet 15 shown has a rotational center 16. An offset angle 17, opposite the offset construction line 87, is an angle formed between a first construction line connecting the rotational center 12 with the rotational center 16 and a second construction line connecting the rotational center 14 and the rotational center 16. As a non-limiting example, a "traction angle" is equivalent to one-half of the offset angle 17 and relates to the traction coefficient µ in the following relationship: µ=tan (traction angle). It should be appreciated that the offset angle 17 may vary during operation of the high ration traction drive transmission 10.

In certain embodiments, shown in FIGS. 2-5, a high ratio traction drive transmission 100 includes a sun roller 101 in contact with a fixed traction planet 102. The fixed traction planet 102 may be supported in a non-rotatable carrier assembly 103. In certain embodiments, shown in FIG. 4, the non-rotatable carrier assembly 103 may include a first carrier member 103A coupled to a second carrier member 103B. It is understood that the first carrier member 103A may be coupled to the second carrier member 103B by any suitable method as desired such as with a plurality of mechanical fasteners 103C, for example.

In certain embodiments, the fixed traction planet 102 may be operably coupled to the carrier assembly 103 through a support shaft 104. The support shaft 104 may be configured to provide radial displacement (or freedom) of the fixed traction planet 102 while constraining rotation about a longitudinal axis 107 indicated in FIG. 4. The longitudinal axis 107 shown is coaxial with the sun roller 101. The fixed traction planet 102 may also be in contact with a traction ring 105. As illustrated in FIG. 1, the traction ring 105 is located radially outward of the fixed traction planet 102 and the sun roller 101. In certain embodiments, a ring coupling 106, shown in FIGS. 3-6, may be coupled to the traction ring 105 and configured to transmit rotational power in or out of the high ratio traction drive transmission 100.

Figure 4:
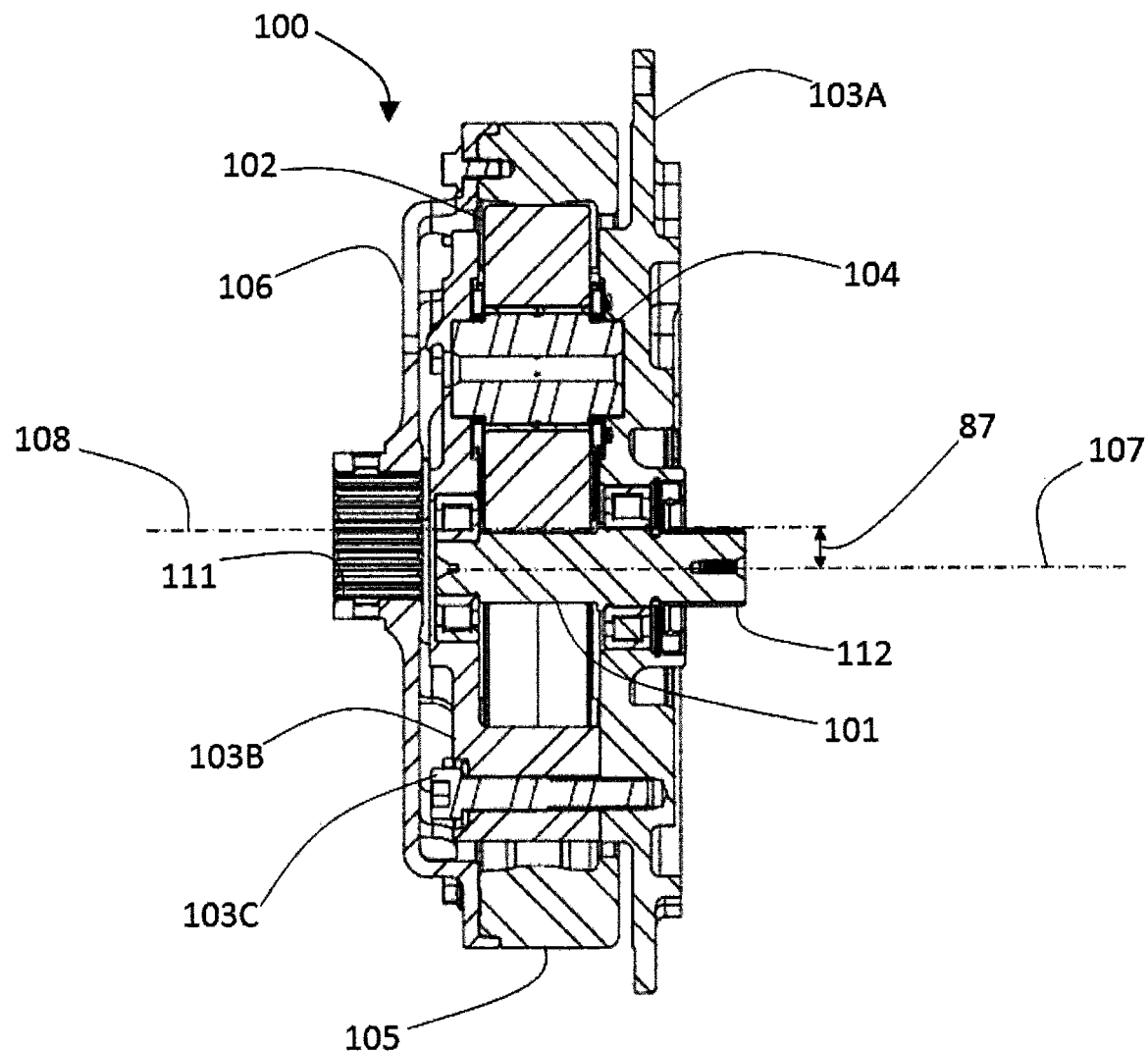
FIG. 4 is a cross-sectional view Y-Y of the transmission of FIG. 3.

As more clearly illustrated in FIG. 4, the longitudinal axis 107 of the sun roller 101 may be offset radially with respect to a rotational centerline 108 of the traction ring 105 when viewed in the plane of the page of FIG. 4. An offset distance 87 may be formed between the longitudinal axis 107 and the rotational centerline 108. It should be appreciated that the offset distance is a function of the overall dimensional size of the transmission 100. As described in reference to FIG. 1, the offset distance 87 may be determined by the selected operating the ring and sun roller diameters, and the nominal floating planet center position. In certain embodiments, the transmission 100 may be provided with a set of traction planets 109 (labeled as "109A" and "109B" in FIG. 2) coupled to the sun roller 101 and the traction ring 105. The traction planets 109 shown are radially outward of the sun roller 101 and radially inward of the traction ring 105. As illustrated, the transmission 100 may be provided with a set of reaction rollers 110 (labeled as "110A" and "110B" in FIG. 2) supported in the carrier assembly 103 by bearings.

It should be appreciated that the transmission 100 may be configured for bidirectional torque transmission. For systems operating in one torque direction only, one of the floating traction planets 109 and its reaction roller 110 can be replaced with a fixed traction planet and bearing structure that is similar function to the fixed traction planet 102 above, but similar in size to the traction planet 109.

In certain embodiments of the transmission 100, the reaction rollers 110 may be located between the fixed traction planet 102 and the floating traction planets 109. The reaction rollers 110 may be positioned to neither contact the traction ring 105 nor the sun roller 101. In one embodiment, the fixed traction planet 102 may be located by contact with the traction ring 105, the sun roller 101 and a reaction roller 110. In said embodiment, the tangential forces on the traction surfaces of the fixed traction planet 102 are transferred to the planet carrier 103 thru the reaction roller 110.

When there is no torque, or a torque below a predetermined threshold, being transmitted through the transmission 100, the reaction rollers 110 are in contact with the floating traction planets 109. Such contact between each reaction roller 110 and respective traction planet 109 positions the floating traction planet 109 so that the floating traction planet 109 is in substantial contact with the traction ring 105 and the sun roller 101 to thereby provide a pre-load condition for the contacting components of the transmission 100. In certain embodiments, the reaction rollers 110 may rotate on a fixed axis. In other embodiments, the reaction rollers 110 may each rotate on an axis which is forced to translate and maintain contact with a floating traction planet 109 when the position of the floating traction planet 109 translates or rotates around the sun roller 101. For example, the reaction roller 110 supplements the torque induced traction contact force at the floating traction planet 109. Such construction may be useful to decrease $\mu$ for lightly loaded conditions at high speed. The tangential forces on the traction surfaces of the floating traction planet 109 may be transferred to the planet carrier 103 through the reaction rollers 110. It should be appreciated that the size of the reaction rollers 110 and/or their radial position determines whether the reaction roller 110 will affect the balance of traction contact normal forces between the floating traction planets 109 and the sun roller 101 and, between the floating traction planets 109 and the traction ring 105.

Figure 5:
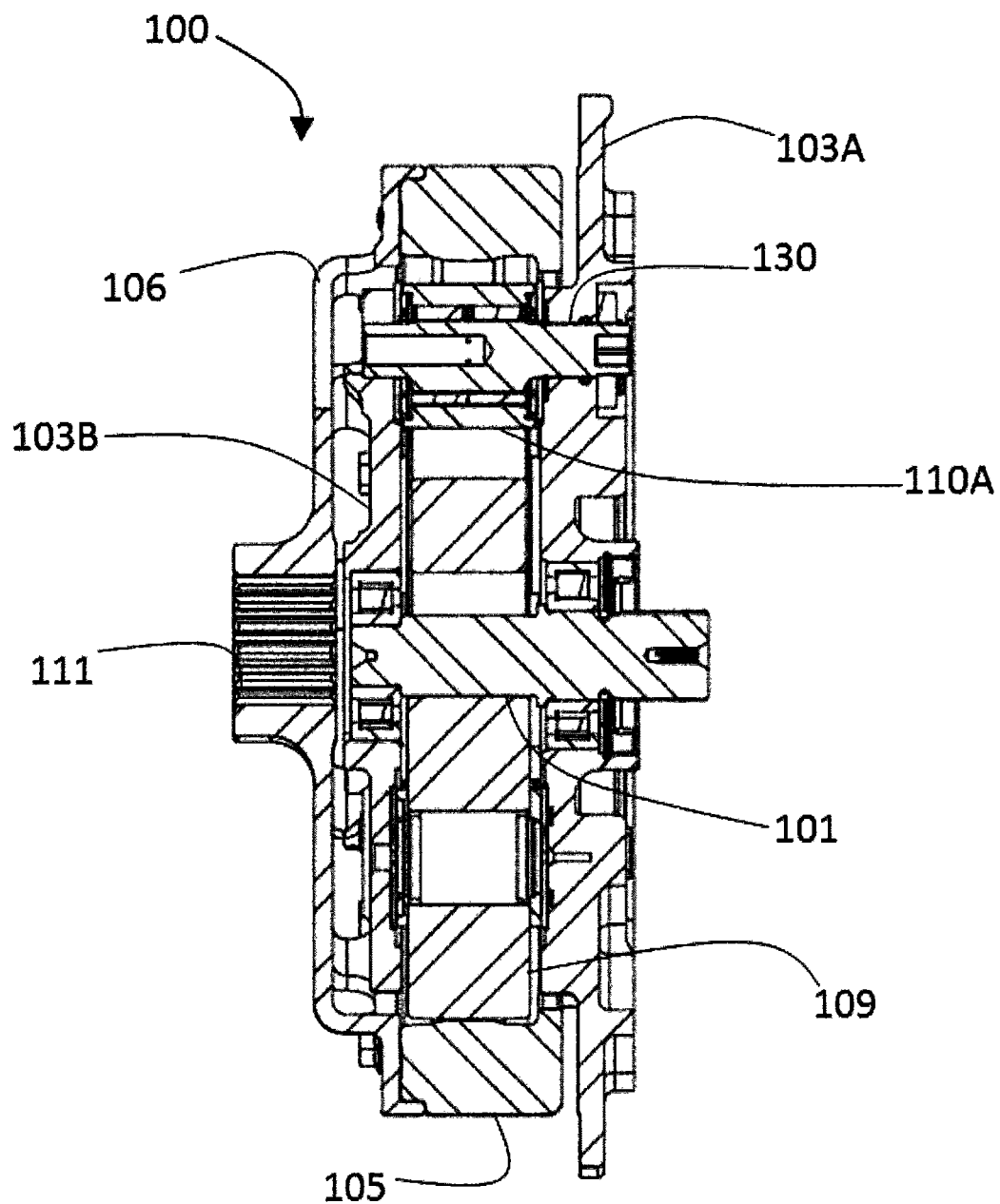
FIG. 5 is a cross-sectional view Z-Z of the transmission of FIG. 3.
Figure 6:
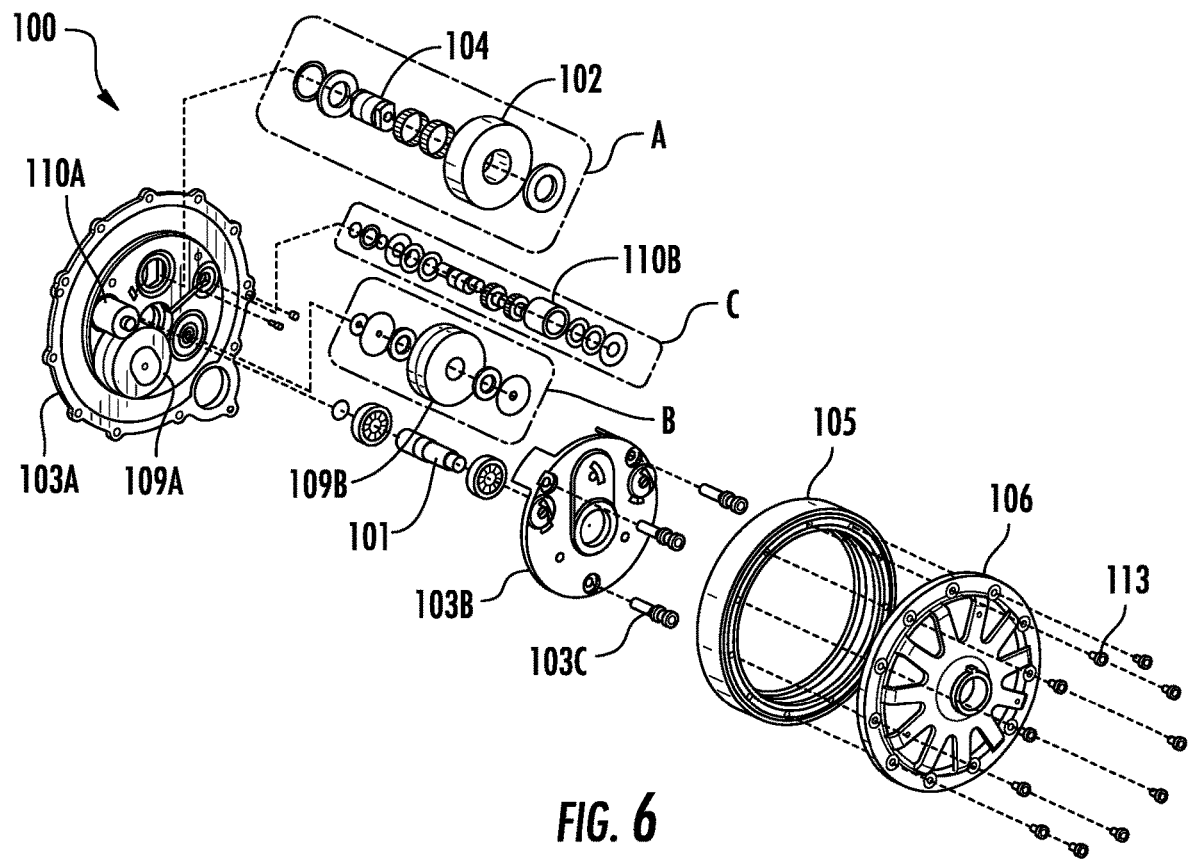
FIG. 6 is an exploded isometric view of the transmission of FIG. 2.

As illustrated in FIGS. 4 and 5, the ring coupling 106 may be provided with a splined interface 111 to transfer rotational power in and out of the transmission 100. In other certain embodiments, the sun roller 101 may be provided with a splined interface 112 to transfer rotational power in and out of the transmission 100. It is understood that the ring coupling 106 may have a generally bowl-shaped body including an outer flange coupled to the traction ring 105, an inner hub having the splined interface 111, and a plurality of elastic fingers connecting the outer flange to the inner bore. It should be appreciated that the ring coupling 106 is configured to provide torsional stiffness while minimizing radial stiffness.

Referring now to FIGS. 6-9, aspects of the assembly of the transmission 100 will be described with reference to a detail view A depicting assembly of the fixed traction planet 102, a detail view B depicting assembly of the floating traction planet 109, and a detail view C depicting assembly of the reaction roller 110.

In one embodiment of the transmission 100, the ring coupling 106 may be coupled to the traction ring 105 with a plurality of fasteners 113, such as bolts or screws, for example. It is understood, however, that the ring coupling 106 may be coupled to the traction ring 105 using any suitable method as desired.

Figure 7:
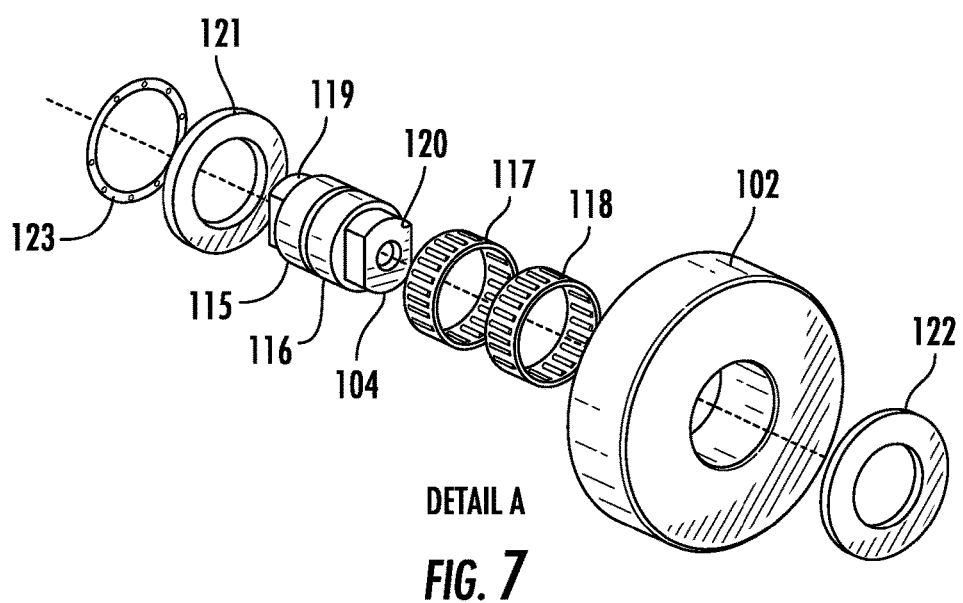
FIG. 7 is an enlarged view of detail view A depicting a fixed traction planet assembly of the transmission of FIG. 6.
Figure 8:
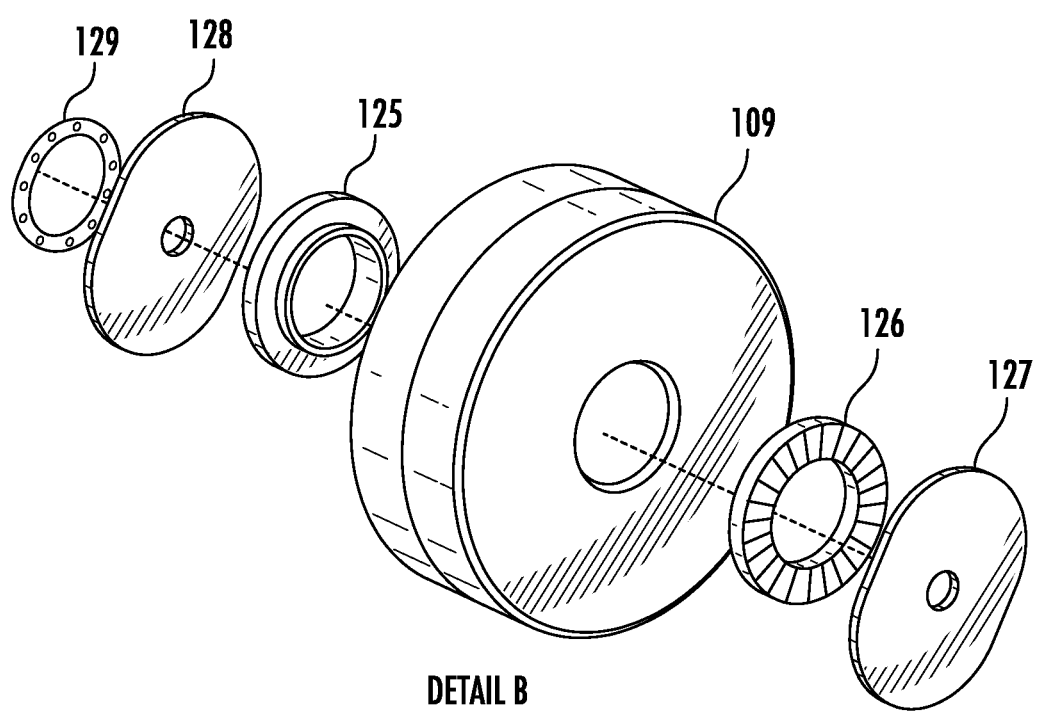
FIG. 8 is an enlarged view of detail view B depicting a floating traction planet assembly of the transmission of FIG. 6.

As more clearly shown in FIG. 7, the fixed traction planet 102 may include a generally cylindrical roller having a central bore. The traction planet 102 may include a crowned outer periphery and may be coupled to the carrier assembly 103 through the support shaft 104. In certain embodiments, the support shaft 104 is provided with a first bearing surface 115 and a second bearing surface 116 formed circumferentially around an outer periphery of the support shaft 104. The first bearing surface 115 may be configured to receive a first bearing 117 thereon. Similarly, the second bearing surface 116 may be configured to receive a second bearing 118 thereon. It is understood that each of the first bearing 117 and the second bearing 118 may be any type of bearing as desired such as a needle roller bearing, for example. It is further understood that the fixed traction planet 102 may be supported by a single bearing, if desired. In certain embodiments, the first bearing surface 115 may be formed adjacent the second bearing surface 116 and located between a first guide end 119 and a second guide end 120 of the support shaft 104, respectively. As illustrated, the first guide end 119 and the second guide end 120 may be at distal lengths of the support shaft 104. The first guide end 119 and the second guide end 120 may each be formed with two substantially parallel engagement lands that are sized to couple to mating surfaces in the carrier assembly 103.

Upon assembly of the transmission 100, the fixed traction planet 102 may be disposed between a first thrust washer 121 and a second thrust washer 122. A wave spring 123 may be coupled to the first thrust washer 121 to provide thrust bearing preload and to provide a biasing force to maintain parallelism between the fixed traction planet 102 and the sun roller 101. In certain embodiments, at least one of the wave spring 123, the first thrust washer 121, and the second thrust washer 122 may be in contact with the carrier assembly 103.

Figure 2:
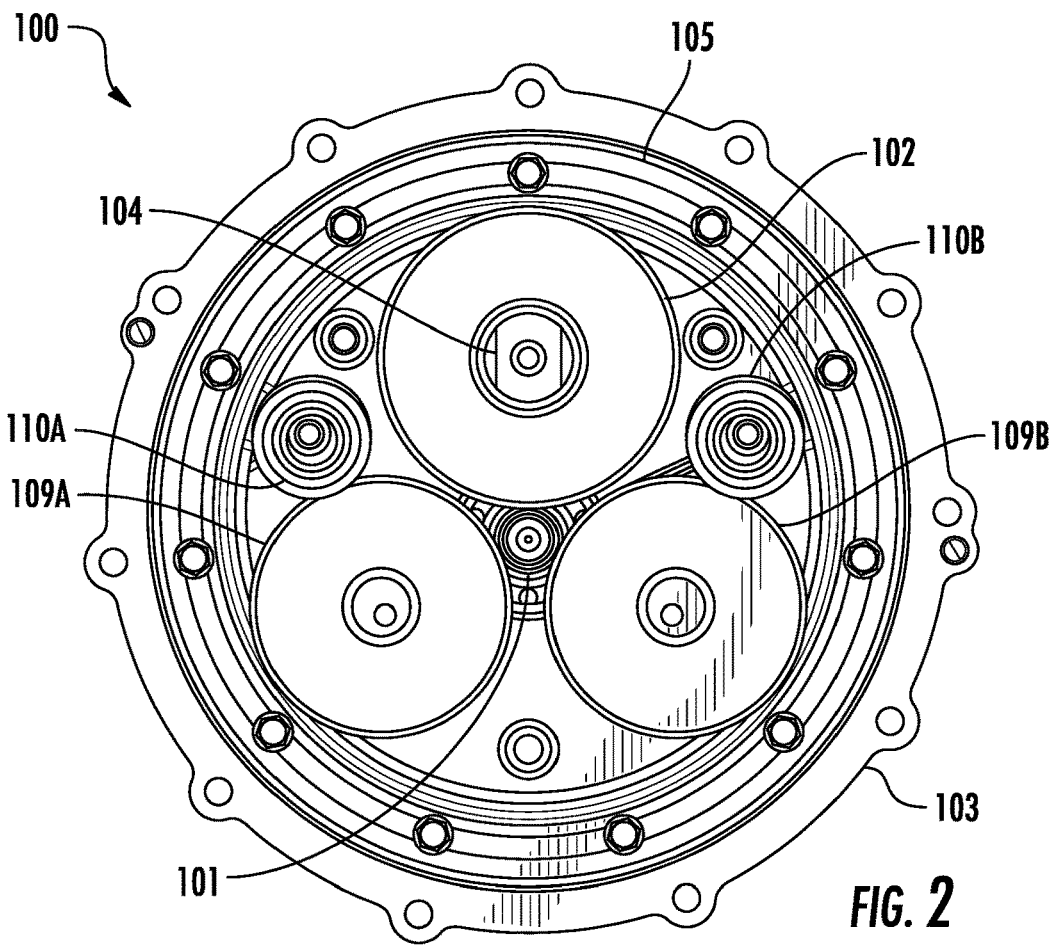
FIG. 2 is an internal end view of a high ratio traction drive transmission.
Figure 3:
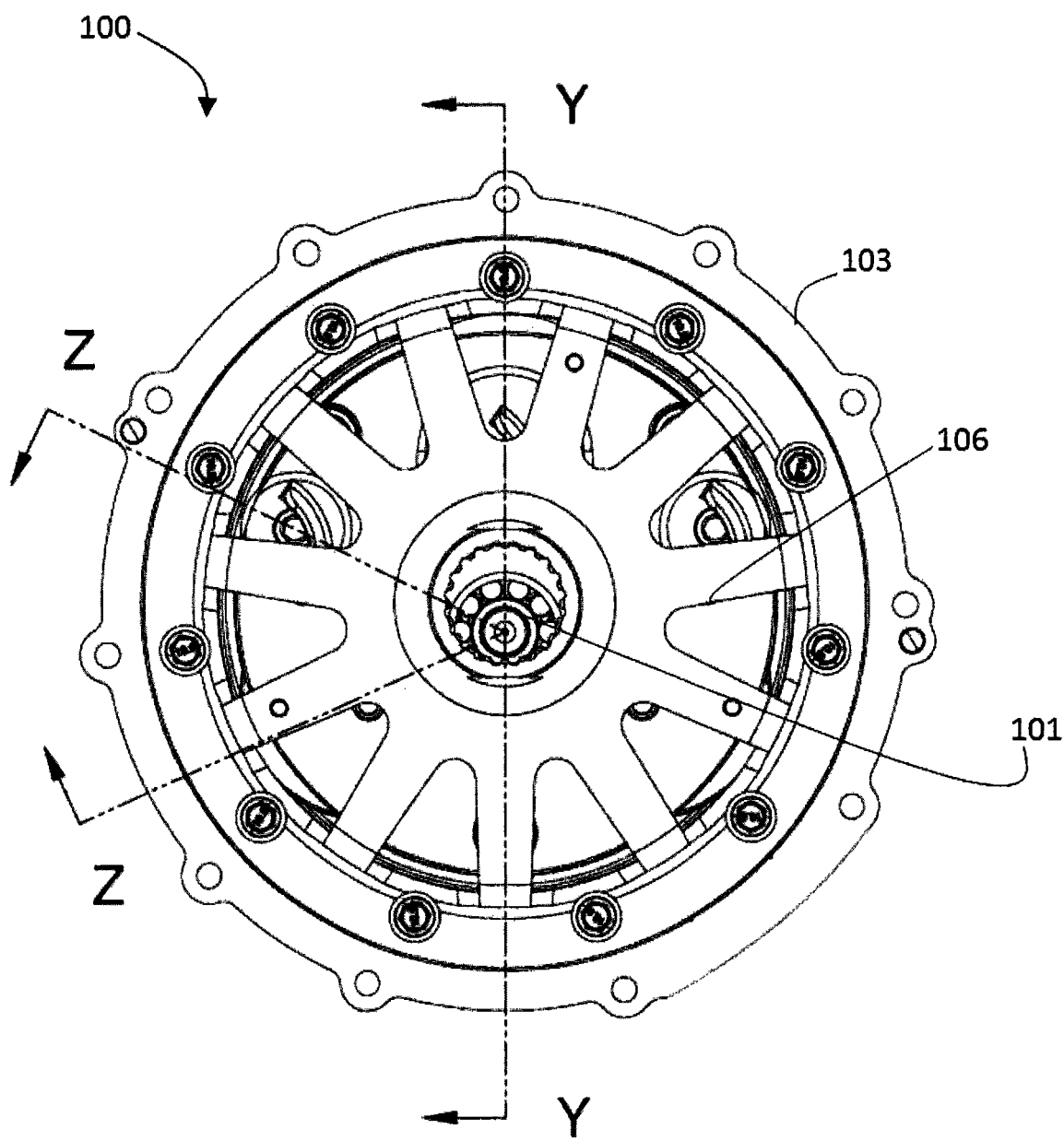
FIG. 3 is an interface end view of the high ratio traction drive transmission of FIG. 2.

In the embodiment shown in FIG. 2, the floating traction planet 109 may be supported axially in the transmission 100 while having freedom to displace rotationally about the sun roller 101 during operation. The floating traction planet 109, more clearly illustrated in FIG. 8, may include a generally cylindrical roller having a central bore. The floating traction planet 109 may be coupled to a bushing 125 arranged coaxially with the central bore. In certain embodiments, the floating traction planet 109 may be coupled to a thrust bearing 126 coaxial with the central bore. As shown, the thrust bearing 126 may be coupled to a first thrust washer 127 and the bushing 125 may be coupled to a second thrust washer 128. It should be appreciated that the thrust washers 127, 128 may have any suitable shape and size as desired. As a non-limiting example, the first thrust washer 127 and the second thrust washer 128 are generally circular in shape. In another non-limiting example, the first thrust washer 127 and the second thrust washer 128 are generally oval in shape and sized and oriented to track the motion of the floating traction planet 109 during operation of the transmission 100. A wave spring 129 may be coupled to the second thrust washer 128. The wave spring 129 may be configured to provide a biasing force to urge the traction planet 109 to a desired longitudinal or axial position within the transmission 100. In certain embodiments, the wave spring 129 may be configured to provide thrust bearing preload and to provide a biasing force to maintain parallelism between the traction planet 109 and the sun roller 101.

Figure 9:
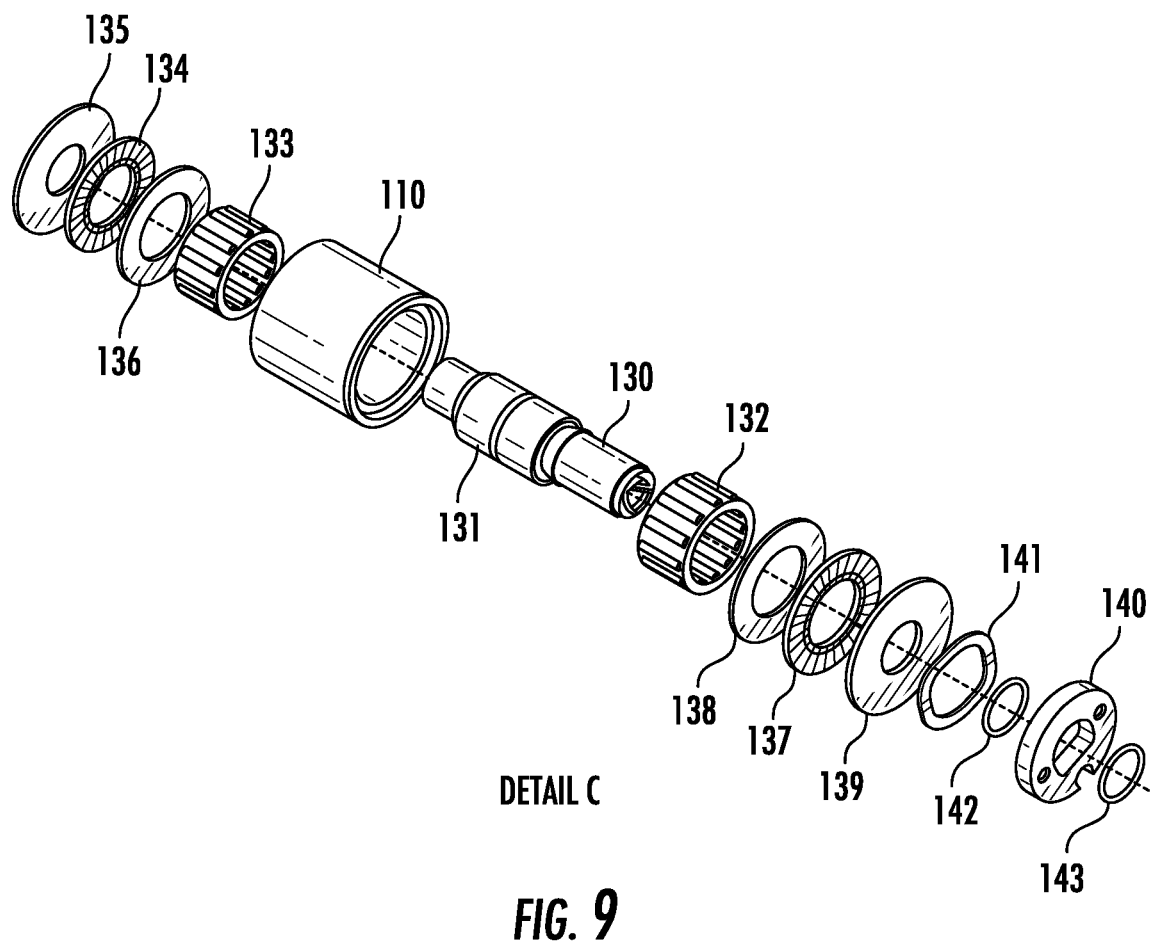
FIG. 9 is an enlarged view of detail view C depicting a reaction roller assembly of the transmission of FIG. 6.

Now referring to FIGS. 5 and 9, the reaction roller 110 may include a generally cylindrical body having a central bore. The reaction roller 110 may be provided with a crowned outer periphery. In certain embodiments, the reaction roller 110 may be coupled to the carrier assembly 103 with a cam shaft 130 arranged within the central bore of the reaction roller 110. The cam shaft 130 shown in FIG. 9 is provided with an eccentric cam lobe 131. It is understood that the eccentric cam lobe 131 may be formed integrally with the cam shaft 130 or as a separate and distinct component fixedly attached to the cam shaft 130. The eccentric cam lobe 131 may be configured to support a first bearing 132 and a second bearing 133. In certain embodiments, the first bearing 132 and the second bearing 133 are interposed between the reaction roller 110 and the cam shaft 130. The eccentric cam lobe 131 may be disposed coaxial with the carrier assembly 103. It should be appreciated, however, that the eccentric cam lobe 131 may be formed in other orientations with the carrier assembly 103 if desired.

As further illustrated in FIG. 9, the reaction roller 110 may be coupled to a first thrust bearing 134 that is flanked on either side by a first thrust washer 135 and a second thrust washer 136. Similarly, the reaction roller 110 may also be coupled to a second thrust bearing 137 that is flanked on either side by a third thrust washer 138 and a fourth thrust washer 139. In one embodiment, a wave spring 141 couples the fourth thrust washer 139 to the carrier 103.

Figure 10:
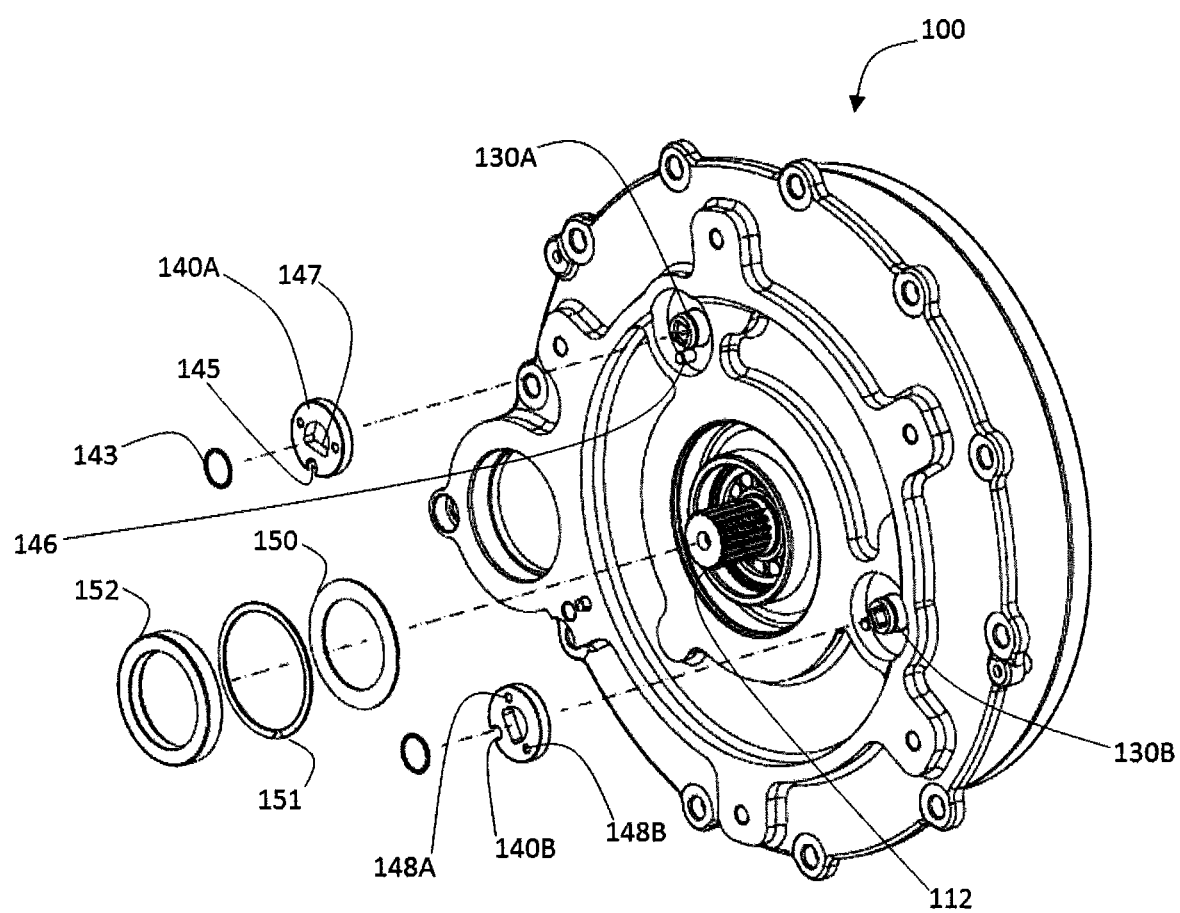
FIG. 10 is a partially exploded isometric view of the transmission of FIG. 2.

A cam positioner 140 may be coupled to one end of the cam shaft 130. Various methods may be employed to couple the cam positioner 140 to the cam shaft 130 such as with a first snap ring 142 and a second snap ring 143, for example. In certain embodiments, shown in FIG. 10, the first reaction roller 110A may be provided with a first cam shaft 130A and a first cam positioner 140A, and the second reaction roller 110B may be provided with a second cam shaft 130B and a second cam positioner 140B. Each of the cam positioner 140 may include a disc-shaped body having a central opening configured to receive a respective one of the cam shafts 130. In certain embodiments, the cam positioners 140 may be provided with a notch 145 configured to engage to a dowel pin 146. As a non-limiting example, the dowel pin 146 may be pressed into the carrier assembly 103. The cam positioner 140 shown may be provided with an engagement surface 147 formed on an inner bore of the cam positioner 140. The engagement surface 147 may be configured for coupling to a mating surface formed on one end of the cam shaft 130. In one embodiment, the cam positioner 140 may be provided with a set of apertures 148 (labeled as "148A" and "148B" in FIG. 10) located adjacent to the engagement surface 147.

The apertures 148 may be configured to receive a working tool, such as a spanner wrench, or another device used for engaging mechanical fasteners during assembly of the transmission 100.

During assembly of the transmission 100, the cam positioner 140 may be rotated with a working tool about a longitudinal axis of the cam shaft 130 and retained in the desired position through engagement and retention of the dowel pin 146 in the notch 145. Rotational adjustment of the cam shaft 130 may be used to provide a predetermined normal force, sometimes referred to herein as "preload", "preload force", or "preloading", between contacting traction components in the transmission 100. In some embodiments, adjustment of the cam shaft 130 may be achieved through alignment of the cam positioner 140 with respect to the carrier assembly 103. As more clearly shown in FIG. 10, the transmission 100 may be provided with a washer 150 and a seal 152 arranged coaxially with the sun roller 101 and a retaining ring 151 which fastens to an inner bore of the second carrier member 103B.

Figure 11:
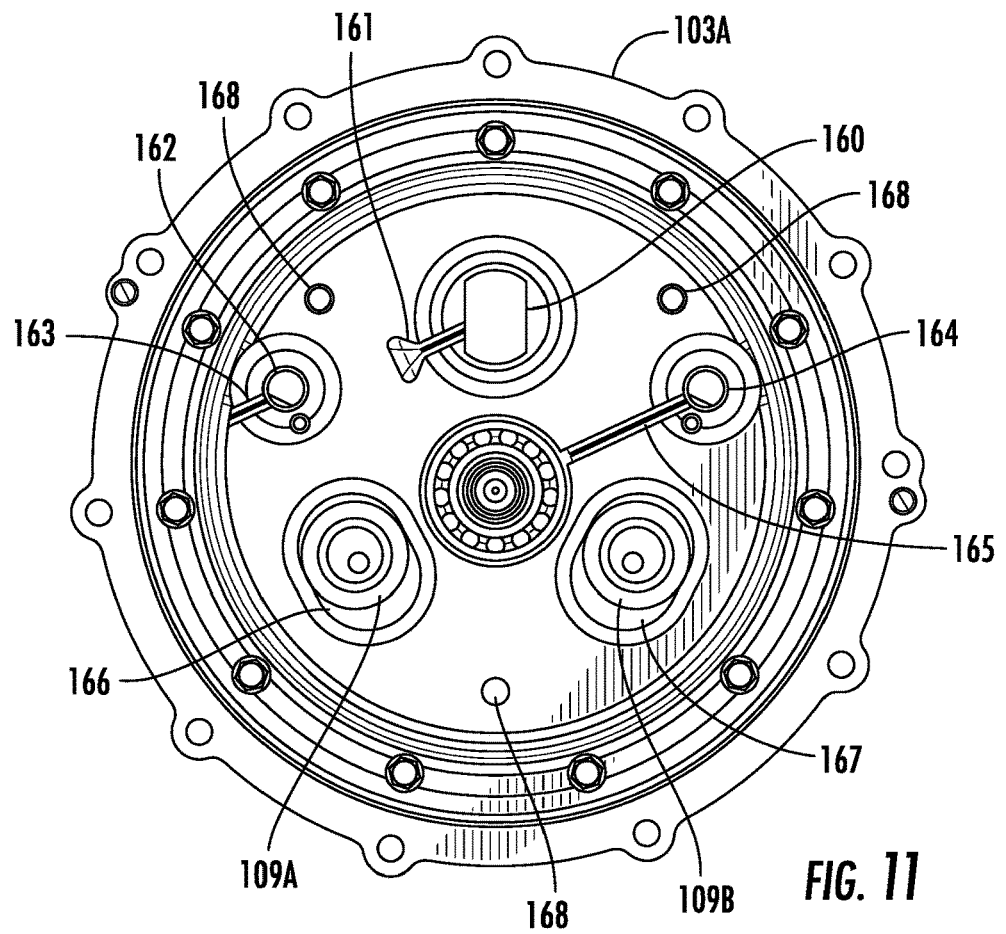
FIG. 11 is an internal end view depicting a carrier assembly of the transmission of FIG. 2.

Referring now to FIG. 11, the first carrier member 103A may be provided with various features to facilitate the support of internal components of the transmission 100 as well as manage fluid distribution to rotating components. For example, in certain embodiments, the first carrier member 103A may be provided with a slot 160 configured to receive the first guide end 119 of the support shaft 104. The slot 160 may be aligned radially with respect to the longitudinal axis of the transmission 100. A first fluid groove 161 may be formed on a face of the first carrier member 103A and directed towards to the slot 160. In non-limiting example, the fluid groove 161 may include a catch formed at one end for entrainment of fluid during operation of the transmission 100.

As further illustrated in FIG. 11, the first carrier member 103A may be provided with a first aperture 162 configured to receive one end of the cam shaft 130A. A fluid groove 163 may be formed on the face of the first carrier member 103A extending from the first aperture 162 toward the traction ring 105. In other certain embodiments, the first carrier member 103A may be provided with a second aperture 164 configured to receive one end of the cam shaft 130B. A fluid groove 165 may also be formed on the face of the first carrier member 103A extending from the second aperture 164 towards the sun roller 101.

The first carrier member 103A shown may also be provided with a first slot 166. The first slot 166 may be configured to receive the thrust washer 128. An orientation of the first slot 166 on the first carrier member 103A may correspond approximately to a range of motion of the traction planet 109A during operation of the transmission 100. In other embodiments, the first carrier member 103A may be provided with a second floating roller guide slot 167. The second floating roller guide slot 167 may be configured to receive the bushing 125. An orientation of the second floating roller guide slot 167 on the first carrier member 103A may correspond to a range of motion of the floating roller 109B during operation of the transmission 100. It is understood that the first carrier member 103A may be provided with a plurality of apertures 168 formed therein, each of which is configured to receive the mechanical fasteners 103C to facilitate coupling of the first carrier member 103A to the second carrier member 103B.

Figure 12:
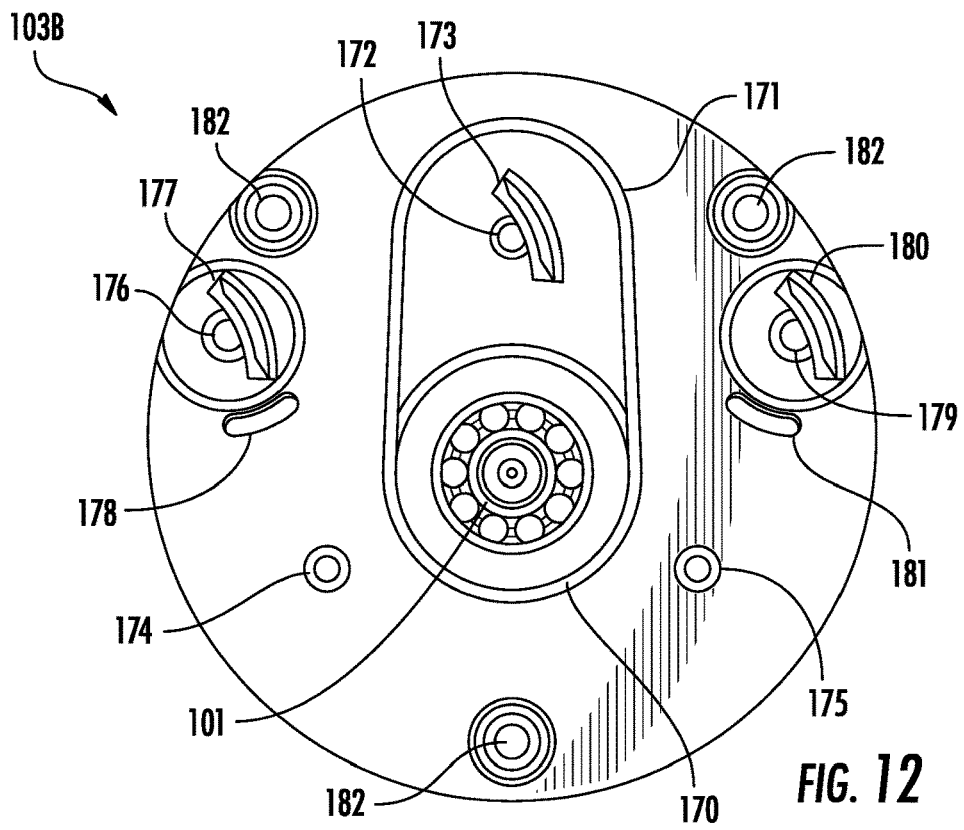
FIG. 12 is an end view depicting a carrier assembly of the transmission of FIG. 2.

As more clearly shown in FIG. 12, the second carrier member 103B has a geometric center arranged coaxially with the longitudinal axis 108 of the ring coupling 106. The second carrier member 103B may be provided with a bearing support hub 170. As illustrated, the bearing support hub 170 may be arranged coaxially with the longitudinal axis 107 of the sun roller 101. In certain embodiments, the bearing support hub 170 may be configured to couple to support bearings of the sun roller 101. As illustrated, a rib 171 radially extends from the bearing support hub 170 towards an aperture 172 configured to receive one end of the support shaft 104. It should be appreciated that the rib 171 may be configured to provide stiffness to the second carrier member 103B.

In some embodiments, a first raised dam 173 extends outwardly from the face of the second carrier member 103B. As shown, the first raised dam 173 is located in proximity to the aperture 172. As a non-limiting example, the first raised dam 173 has a general curved surface. It is understood, however, that the first raised dam 173 may have any shape and size as desired. In certain embodiments, the first raised dam 173 is positioned to be in the path of fluid spray during operation of the transmission 100.

The second carrier member 103B, shown in FIG. 12, may also be provided with a first aperture 174, a second aperture 175, a first reaction roller aperture 176, and a second reaction roller aperture 179. In one embodiment, the first aperture 174 and the second aperture 175 may be configured to support alignment pins during assembly of the transmission 100, whereas the reaction roller apertures 176, 179 may be configured to receive respective ends of the cam shafts 130A, 130B. A second raised dam 177 may be formed to extend axially from the face of the second carrier member 103B in proximity to the first reaction roller aperture 176 and a third raised dam 180 may be formed to extend axially from the face of the second carrier member 103B in proximity to the second reaction roller aperture 179.

A first opening 178 and a second opening 181 may be formed in the second carrier member 103B. As illustrated in FIG. 12, the openings 178, 181 are formed in proximity to the reaction roller apertures 176, 179, respectively, to provide sight paths to view internal components during assembly of the transmission 100. It is understood that the second carrier member 103B may also be provided with a plurality of apertures 182 formed therein, each of which is configured to receive the mechanical fasteners 103C to facilitate coupling of the second carrier member 103B to the first carrier member 103A.

Figure 13:
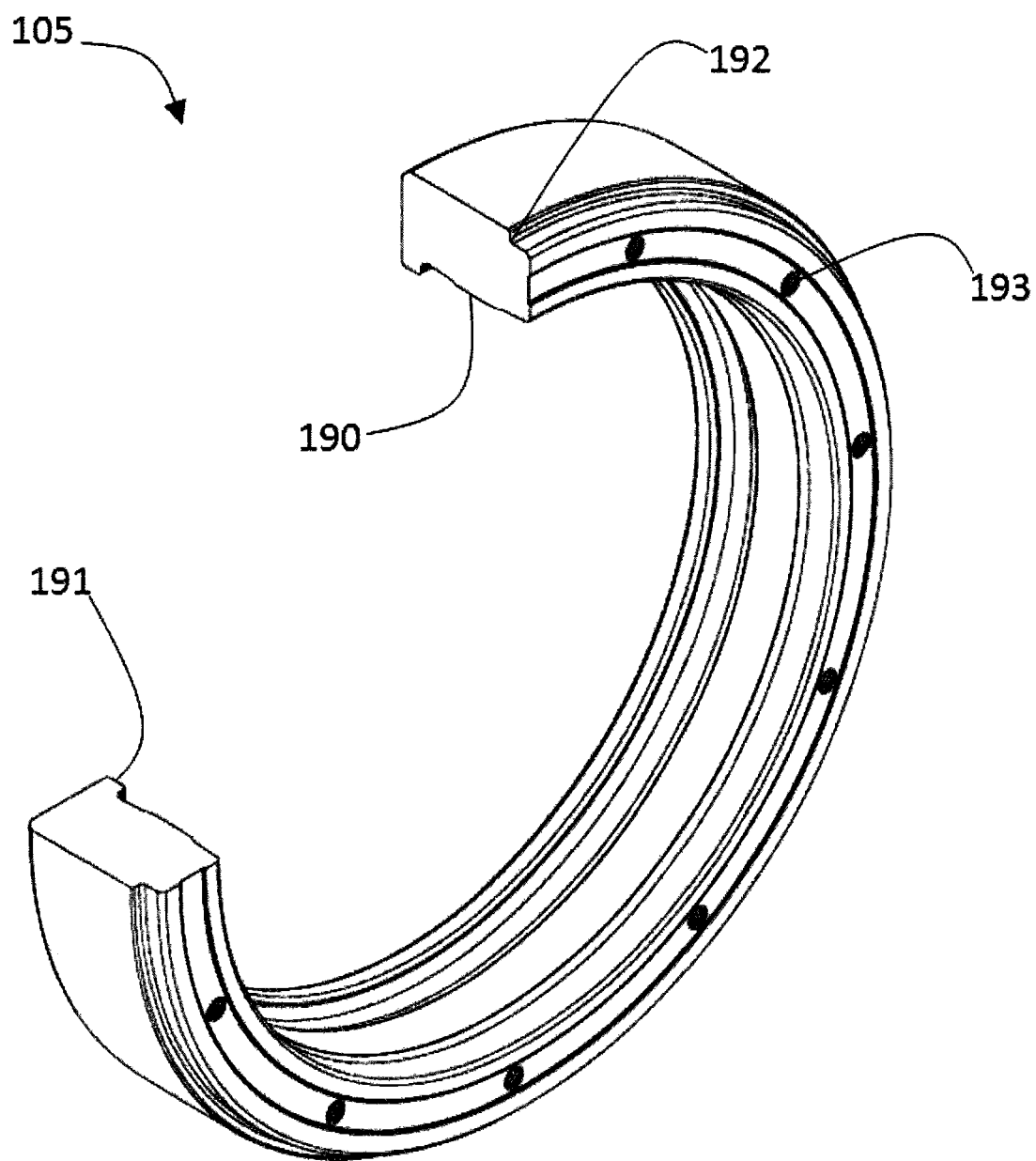
FIG. 13 is an isometric cross section view of a traction ring of the transmission of FIG. 2.

Referring now to FIG. 13, the traction ring 105 shown includes a generally annular ring having a traction surface 190 formed on an inner bore, a circumferential flange 191 formed on a first side of the traction surface 190, and a pilot diameter 192 formed on a second side of the traction surface 190. In certain embodiments, the traction surface 190 is crowned, or profiled in some form foreshortened, in the longitudinal plane, in order to increase the ring-to-roller contact hertz pressure of the fixed traction planet 102 and the floating traction planets 109. It is advantageous for the ring-to-planet contact hertz pressure to approach the hertz pressure existing at the sun roller-to-planet contacts. Further, the traction ring 105 may also include end plate features such as the circumferential flange 191 configured to manage traction ring stress and deflections. The pilot diameter 192 may be configured to receive the ring coupling 106 that is coupled to the traction ring 105. In certain embodiments, the ring coupling 106 further contributes to the management of traction ring stress and deflections. It is understood that the ring coupling 106 may be coupled to the traction ring 105 via mechanical fasteners received through a plurality of apertures 193 formed in the traction ring 105. Various other methods of coupling the ring coupling 106 to the traction ring 105 may be employed if desired. For example, the ring coupling 106 may be formed integral with the traction ring 105 or as a separate and distinct component which may be joined with the traction ring 105 using a weldment, press fit, spline fit, and the like.

It should be noted that the description above has provided dimensions for certain components or subassemblies. The mentioned dimensions, or ranges of dimensions, are provided in order to comply as best as possible with certain legal requirements, such as best mode. However, the scope of the embodiments described herein are to be determined solely by the language of the claims, and consequently, none of the mentioned dimensions is to be considered limiting on the inventive embodiments, except in so far as any one claim makes a specified dimension, or range of thereof, a feature of the claim.

While various embodiments have been described above, it should be understood that they have been presented by way of example, and not limitation. It will be apparent to persons skilled in the relevant arts that the disclosed subject matter may be embodied in other specific forms without departing from the spirit or essential characteristics thereof. The embodiments described above are therefore to be considered in all respects as illustrative, not restrictive.

What is claimed is:

1. A transmission, comprising:
a sun roller having a first longitudinal axis;
a traction ring having a second longitudinal axis, wherein the first longitudinal axis is radially offset from the second longitudinal axis;
a plurality of traction planets disposed adjacent the sun roller and the traction ring, wherein the plurality of traction planets includes at least one fixed traction planet and at least one floating traction planet;
at least one reaction roller disposed adjacent at least one of the traction planets, wherein the at least one reaction roller is in contact with the at least one floating traction planet; and
a carrier assembly coupled to at least one of the traction planets and the at least one reaction roller.

2. The transmission of claim 1, wherein the at least one fixed traction planet is in contact with at least one of the sun roller and the traction ring.

3. The transmission of claim 1, wherein the carrier assembly is coupled to the at least one fixed traction planet.

4. The transmission of claim 1, further comprising a ring coupling coupled to the traction ring.

5. The transmission of claim 4, wherein the ring coupling further comprises an inner hub having a spline interface arranged coaxially with the second longitudinal axis, an outer flange coupled to the traction ring, and a number of elastic fingers connecting the inner hub with the outer flange.

6. The transmission of claim 1, further comprising a cam shaft coupled to the at least one reaction roller.

7. The transmission of claim 6, further comprising a cam positioner coupled to the cam shaft.

8. The transmission of claim 6, wherein the cam shaft includes a cam lobe located between a first end and a second end thereof.

9. The transmission of claim 7, wherein the cam shaft is coupled to the cam positioner at a first end thereof, and the cam shaft is coupled to the carrier assembly at a second end thereof.

10. The transmission of claim 7, wherein the cam positioner is coupled to the carrier assembly.

11. The transmission of claim 1, further comprising a support shaft coupled to the at least one fixed traction planet, wherein the support shaft couples to a first carrier member of the carrier assembly.

12. The transmission of claim 11, wherein the first carrier member includes a slot configured to receive the support shaft therein.

13. The transmission of claim 11, wherein at least one of the first carrier member and the second carrier member includes at least one of a fluid groove and a raised dam, wherein the fluid groove and the raised dam are configured to direct fluid to at least one of the at least one reaction roller and at least one of the traction planets.

14. A transmission, comprising:
a sun roller having a first longitudinal axis;
a traction ring having a second longitudinal axis, wherein the first longitudinal axis is radially offset from the second longitudinal axis;
a plurality of traction planets disposed adjacent the sun roller and the traction ring;
at least one reaction roller disposed adjacent at least one of the traction planets;
a carrier assembly coupled to at least one of the traction planets and the at least one reaction roller; and
a ring coupling coupled to the traction ring, wherein the ring coupling further comprises an inner hub having a spline interface arranged coaxially with the second longitudinal axis, an outer flange coupled to the traction ring, and a number of elastic fingers connecting the inner hub with the outer flange.

15. A transmission, comprising:
a sun roller having a first longitudinal axis;
a traction ring having a second longitudinal axis, wherein the first longitudinal axis is radially offset from the second longitudinal axis;
a plurality of traction planets disposed adjacent the sun roller and the traction ring;
at least one reaction roller disposed adjacent at least one of the traction planets;
a carrier assembly coupled to at least one of the traction planets and the at least one reaction roller; and
a cam shaft coupled to the at least one reaction roller.

* * * * *